United States Patent
Jung

(10) Patent No.: US 11,405,208 B2
(45) Date of Patent: Aug. 2, 2022

(54) VEHICLE COMMUNICATION SYSTEM AND METHOD OF SECURITY COMMUNICATION THEREFOR

(71) Applicants: HYUNDAI MOTOR COMPANY, Seoul (KR); KIA MOTORS CORPORATION, Seoul (KR)

(72) Inventor: Ho Jin Jung, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 16/921,238

(22) Filed: Jul. 6, 2020

(65) Prior Publication Data
US 2021/0119800 A1   Apr. 22, 2021

(30) Foreign Application Priority Data
Oct. 17, 2019   (KR) .................. 10-2019-0129012

(51) Int. Cl.
*H04L 9/32* (2006.01)
*H04L 9/08* (2006.01)
*H04L 9/06* (2006.01)

(52) U.S. Cl.
CPC .......... *H04L 9/3226* (2013.01); *H04L 9/0662* (2013.01); *H04L 9/0838* (2013.01)

(58) Field of Classification Search
USPC ........ 713/168, 150, 163, 181; 726/2, 21, 36; 380/255, 264, 276
See application file for complete search history.

(56) References Cited

U.S. PATENT DOCUMENTS

| | | | |
|---|---|---|---|
| 8,522,028 B2* | 8/2013 | Brique | G06F 21/606 713/168 |
| 11,080,387 B1* | 8/2021 | Lattin | G06F 21/44 |
| 2010/0191967 A1* | 7/2010 | Fujii | G06F 21/32 713/169 |
| 2015/0350167 A1* | 12/2015 | Djakovic | H04L 63/0823 713/163 |
| 2019/0007215 A1* | 1/2019 | Hakuta | H04W 12/069 |
| 2021/0119800 A1* | 4/2021 | Jung | H04L 63/166 |
| 2021/0209494 A1* | 7/2021 | Mukherjee | H04L 67/12 |
| 2021/0211271 A1* | 7/2021 | Kuang | H04L 9/3239 |
| 2021/0250174 A1* | 8/2021 | Cheng | H04L 9/3228 |
| 2021/0281408 A1* | 9/2021 | Liu | H04L 63/08 |
| 2022/0123923 A1* | 4/2022 | Patne | H04L 9/0838 |

* cited by examiner

*Primary Examiner* — Sharif E Ullah
(74) *Attorney, Agent, or Firm* — Slater Matsil, LLP

(57) ABSTRACT

A security communication method of a client ECU included in a vehicle Ethernet network includes transmitting a first message generated based on a first random number generated by the client ECU, first security version information of the client ECU, and a symmetric key pre-shared with a server ECU, to the server ECU, receiving a second message generated based on a second random number generated by the server ECU, second security version information of the server ECU, and the symmetric key in response to the first message, from the server ECU, when successfully verifying the second message, storing the second random number in a memory of the client ECU, transmitting a third message to the server ECU and generating a session key based on the first random number, the second random number, and the symmetric key, and transmitting a fourth message encrypted using the session key to the server ECU.

14 Claims, 4 Drawing Sheets

VEHICLE COMMUNICATION SYSTEM AND METHOD OF SECURITY COMMUNICATION THEREFOR

CROSS-REFERENCE TO RELATED APPLICATION

The present application claims priority to and the benefit of Korean Patent Application 10-2019-0129012, filed on Oct. 17, 2019 which is hereby incorporated by reference in its entirety.

TECHNICAL FIELD

The present disclosure relates to a vehicle communication system based on a transport layer security appropriate for a vehicle environment and a security communication method therefor.

BACKGROUND

The statements in this section merely provide background information related to the present disclosure and may not constitute prior art.

In accordance with recent trends, a frequency of cooperation control between controllers as well as the number of electronic control units (ECUs) installed in a vehicle has increased in order to provide more various safety functions and convenience functions through the vehicle. Thus, the amount of communication data of an in-vehicle communication network has increased and a communication protocol having an enhanced speed and bandwidth, such as a flexible data-rate (FD) or Ethernet as well as a controller area network (CAN) communication protocol has been applied to vehicle communication. In particular, there is an increasing need for the Ethernet communication protocol due to an increase in requirement for a fast controller reprogram as well as image processing.

The importance of security along with increase in traffic in a vehicle communication environment has increased. For example, as V2X technology has become popular, messages including information sensitive to security, such as charging costs, a vehicle position, or personal information are exchanged through communication with an external infrastructure or other vehicles. Currently, in the Internet-based communication such as a hypertext transfer protocol (HTTP) or a protocol with an external server, transport layer security (TLS) technology corresponding to the 4 layer security standard has been commonly used.

A handshake procedure defined in such TLS technology includes total 10 steps (messages), in which case supported code suites are transmitted, a key is shared therebetween, and a session key to be used in each session is generated and is used in message encryption.

SUMMARY

Accordingly, the present disclosure is directed to a vehicle communication system and a security communication method thereof for providing a more enhanced vehicle communication environment.

The present disclosure provides a security communication method of a client electronic control unit (ECU) included in a vehicle Ethernet network includes transmitting a first message generated based on a first random number generated by the client ECU, first security version information of the client ECU, and a symmetric key pre-shared with a server ECU, to the server ECU, receiving a second message generated based on a second random number generated by the server ECU, second security version information of the server ECU, and the symmetric key in response to the first message, from the server ECU, when successfully verifying the second message, storing the second random number in a memory of the client ECU, transmitting a third message to the server ECU and generating a session key based on the first random number, the second random number, and the symmetric key, and transmitting a fourth message encrypted using the session key to the server ECU.

In another aspect of the present disclosure, a security communication method of a server electronic control unit (ECU) included in a vehicle Ethernet network includes receiving a first message generated based on a first random number generated by a client ECU, first security version information of the client ECU, and a symmetric key preshared with the server ECU, from the client ECU, when successfully verifying the first message, storing the first random number, transmitting a second message generated based on a second random number generated by the server ECU, second security version information of the server ECU, and the symmetric key, to the client ECU, and generating a session key based on the first random number, the second random number, and the symmetric key, receiving a third message from the client EU in response to the second message, and after receiving the third message, when receiving a fourth message from the client ECU, decoding the fourth message based on the session key.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
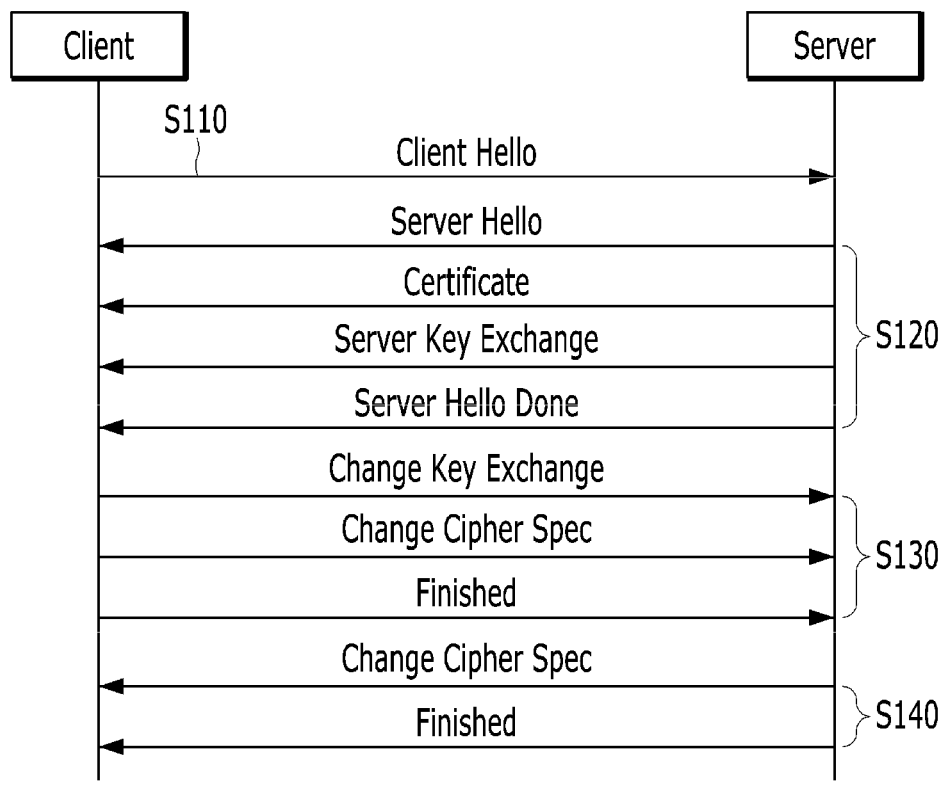
FIG. 1 is a diagram showing a handshake procedure of general transport layer security (TLS) technology.

The drawings described herein are for illustration purposes only and are not intended to limit the scope o the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

In some forms of the present disclosure, a transport layer security (TLS)-based communication procedure may become effective according to the characteristics of a vehicle network environment while security is maintained in communication between a server and a client in vehicle networks connected through the Ethernet. To this end, first, the characteristics of the vehicle network will be described below.

Vehicle networks are all designed with reference to a pre-shared database. Thus, it may not be required to share a cipher suite about a type of an encryption algorithm to be used between specific controllers in one vehicle network.

The second TLS technology uses asymmetric key-based encryption. The asymmetric key includes a private key and a public key and these keys need to have unique values for respective objects (e.g., controllers) which participate in communication. However, in accordance with upward trends of controllers installed in a single vehicle, it is not actually possible to allocate unique values for the respective controllers.

As a result, in some forms of the present disclosure, a pre-shared key (PSK) may be used to manage a key, and in this case, the corresponding PSK may not be directly used, but instead, different session keys may be used for respective sessions.

In the general TLS technology, a server certificate is transmitted to a client. In some forms of the present disclosure, a message authentication code (MAC) may be generated using a PSK while an initial start message is transmitted, and thus, authentication between a server and a client may be performed.

Prior to a communication procedure in some forms of the present disclosure, common assumption that is commonly applied to the following description will be described below.

First, both the client and the server are assumed to be configured in units of electronic control units (ECUs).

In addition, all controllers in a single network including the client and the server are assumed to have the same PSK. In this case, the PSK may be stored in a safe storage in a separate controller and the single network may include a controller for performing communication through TLS-based encryption in a single vehicle, but the present disclosure is not limited thereto. The PSK may be a secret key and may be configured in the form of a symmetric key.

In addition, all controllers in the single network may be assumed to pre-contain the same key generation algorithm, session key generation algorithm, and MAC generation algorithm.

FIG. 1 is a diagram showing a handshake procedure of general transport layer security (TLS) technology.

Referring to FIG. 1, the handshake procedure of the TLS technology may be started by transmitting a message "ClientHello" to a server by a client (S110). In this case, the corresponding message may include a random character string value.

In response thereto, the server transmits a message "ServerHello" to the client, transmits "Certicate" including certificate of the server and a server key exchange message, and may transmit a message "ServerHelloDone", which means that transmission of the aforementioned message is finished, to the client (S120).

The client verifies the certificate to generates an arbitrary pre-master secret, encrypts the arbitrary pre-master secret using a public key included in the server certificate, transmits a message "ClinetKeyExchange" to the server, notifies the server about generation of a session key through a message "ChangeCipherSpec", and then, transmits a finished message to the server (S130).

Thus, the server decodes the received information to identify the pre-master secret and generates a master secret based on the pre-master secret. The server generates a session key based on the master secret. The server may notify the client about generation of the session key through the message "ChangeCipherSpec" and transmits the finished message to the client, and thus, finishes the handshake procedure (S140).

A secure channel is configured through the handshake procedure, and subsequent communication between the server and the client is encrypted using session key generated by each of the server and the client.

The aforementioned TLS technology provides the following security.

Message certificate: Verify whether a received message is transmitted from a reliable counterpart Message integrity: Verify whether a received message is not modulated in a communication procedure Message confidentiality: Process transmitted and received messages not to be seen Rejection prevention: Technology of preventing rejection of a fact by verifying the fact after a message is transmitted and received or communication or processing is executed The TLS technology has been widely adapted due to advantages of ensuring such security.

However, as shown in FIG. 1, the general TLS technology requires total 10 steps, and thus, the handshake procedure is excessively complicated and a high computational load is required due to key exchange based on an asymmetric key and certificate transmission. Previous key exchange or encryption method is not verified between the client and the server, and thus, a cipher suite is transmitted therebetween.

However, since signals configured in the form of a pre-determined database (DB) are generally exchanged in a vehicle communication environment, cipher suite exchange is not necessarily shared in many cases, and it is difficult to input unique private keys to all respective numerous controllers installed in a vehicle, and accordingly, the asymmetric key method is not appropriate.

As a result, procedures of the TLS method are too complicated to be applied in vehicle communication without changes and have a high computational load, and thus, there is a problem in that unnecessary delay occurs, and also, it is difficult to manage keys for respective numerous controllers while a vehicle or a controller is manufactured.

Figure 2:
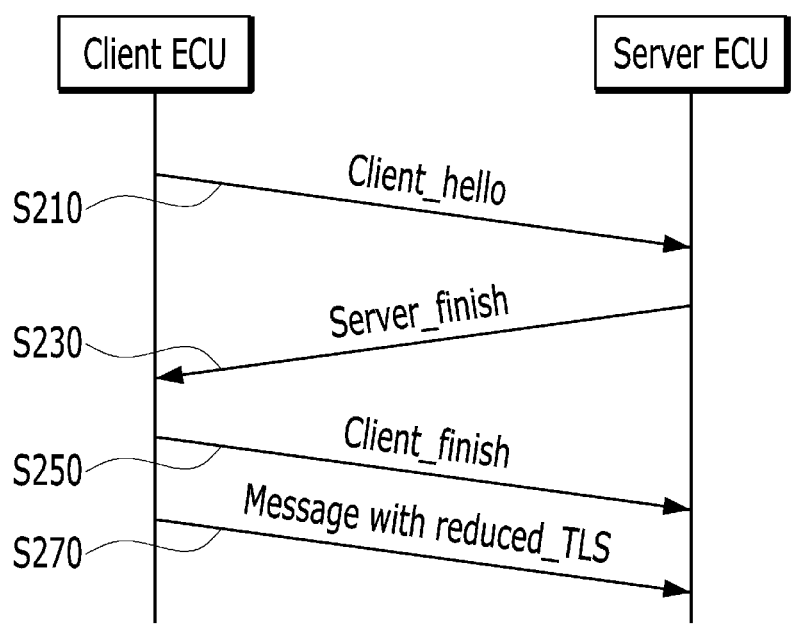
FIG. 2 is a diagram showing a communication procedure between a server and a client based on transport layer security (TLS) in one form of the present disclosure.

FIG. 2 is a diagram showing a communication procedure between a server and a client based on transport layer security (TLS) in some forms of the present disclosure.

Referring to FIG. 2, the communication procedure in some forms of the present disclosure may be largely simplified by three message exchange operations S210, S230, and S250 performed before an encrypted message (Message with reduced TLS) that is an actual security target is exchanged (S270), compared with a conventional message exchange including 10 steps.

In detail, in predefined communication between a client ECU and a server ECU, first, the client ECU may transmit a message Client_hello as a start message (S210), and the server ECU may transmit a message Server_finish as final response in response thereto (S230) and may generate a session key. The client ECU may also transmit a message Client_finish to a server and may generate a session key to finish TLS encryption application preparation in some forms of the present disclosure (S250). Then, encryption and message authentication code (MAC) may be additionally transmitted between the client ECU and the server ECU and message security may be performed. Here, the message Client_hello may be a message that is initially transmitted by a client when TLS-based encrypted data communication procedure is started, and may refer to a message that lists encryption information such as a TLS version or Cipher-Suite (in an order of setting a client environment) supported by the client. The message Server_finish may refer to a message indicating that a part that needs to be prepared by the server is completed in preparation in encrypted data communication. The message Client_finish may refer to a message indicating that a part that needs to be prepared by the client is completed in preparation in encrypted data communication.

Hereinafter, the communication procedure described above with reference to FIGS. 3 and 4 will be described in more detail.

Figure 3:
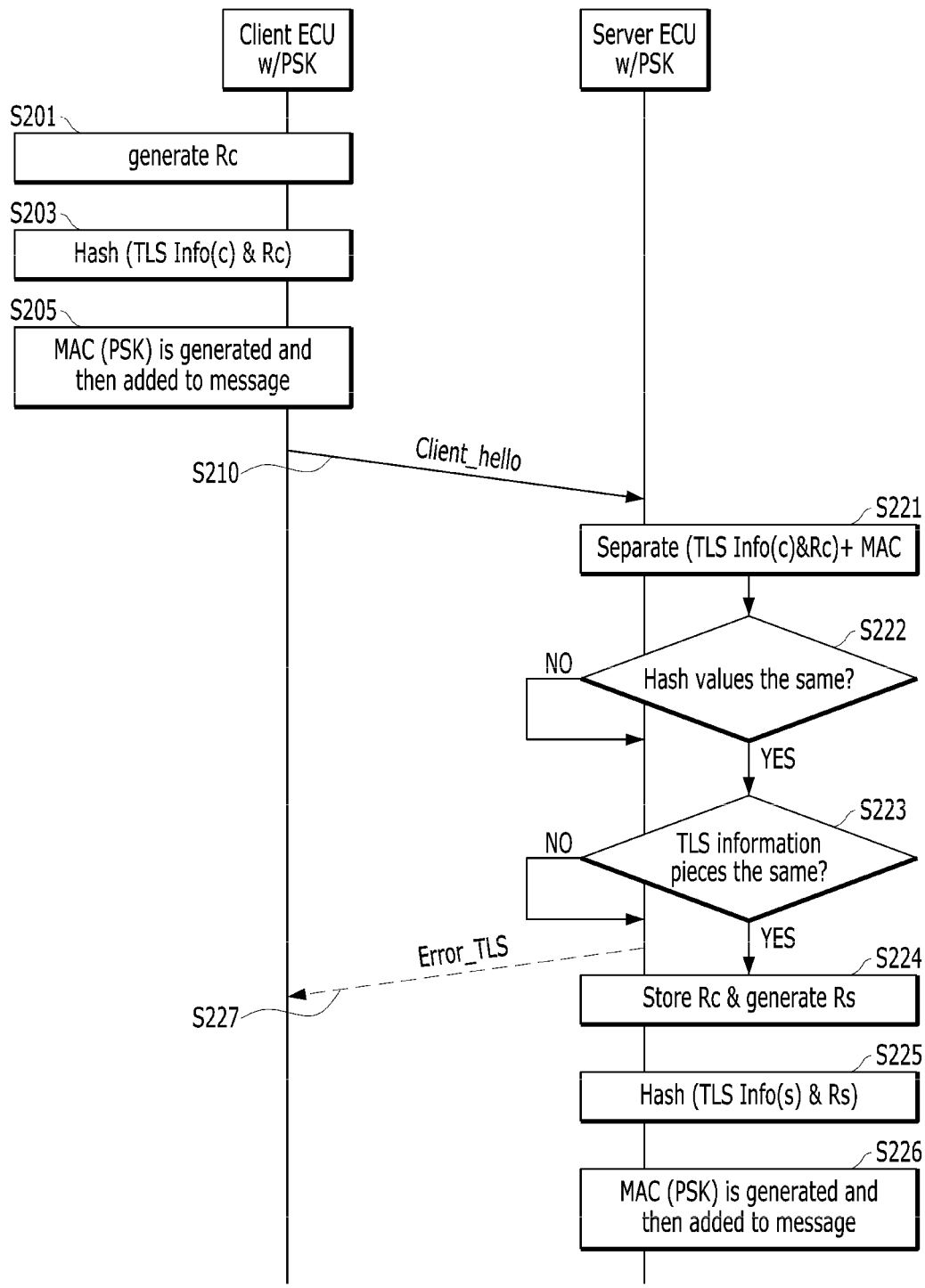
FIGS. 3 and 4 are diagrams showing the communication procedure between the server and the client based on TLS shown in FIG. 2 in detail.
Figure 4:
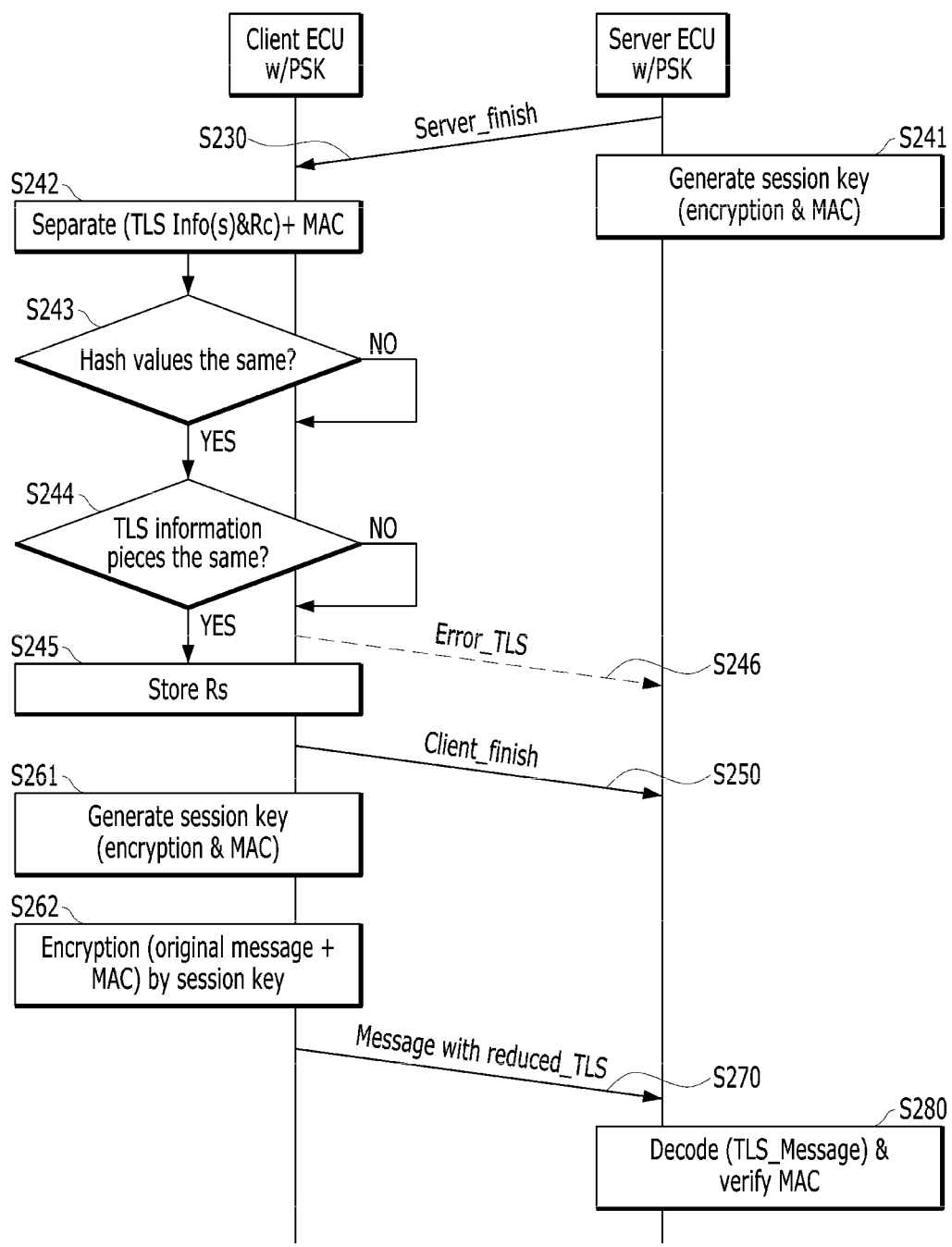

FIGS. 3 and 4 are diagrams showing the communication procedure between the server and the client based on TLS shown in FIG. 2 in detail. Here, FIG. 4 shows a subsequent procedure of FIG. 3.

First, referring to FIG. 3, the client ECU may generate a random number Rc thereof (S201), may hash TLS version information (i.e., "TLS info(c)") and the random number Rc that are contained in the client ECU (S203), and may encrypt the hash value using a key (PSK) to generate a MAC (S205).

The client ECU may add the generated MAC to the TLS version information (TLS info(c)) and the random number Rc to configure the message Client_hello and may transmit the message Client_hello to the server ECU (S210). That is, the message Client_hello may be configured in the form of "(TLS Info/client's Random number)+MAC".

Here, addition of the MAC may be a concept of digital signature for verifying information modulation of TLS version information or a random number and whether information is transmitted from an appropriate transmitter. A hash algorithm of SHA 256 or greater may be applied to calculate a hash value, but the present disclosure is not limited thereto.

The server ECU may separate a general message and a MAC part from the received message Client_hello, and the general message may be hashed and the MAC part may be decoded using the PSK (S221).

Then, the server ECU may compare whether a hash value obtained by decoding the MAC and a hash value obtained by hashing the general message part are the same (S222), and when the values are the same, the server ECU may determine whether TLS version information included in the general message is the same as TLS version information of the server ECU (S223).

When the hash values are the same and the TLS version information pieces are the same, the server ECU may store the random number Rc of the client ECU in a memory of the server ECU and may generate a random number Rs of the server ECU (S224).

Then, the server ECU may hash version information (TLS info(s)) of the server ECU and the random number Rs of the server ECU (S225) and may encrypt the hash value using the PSK to generate the MAC (S226).

When the hash values are not the same (NO of S222) or the version information pieces are not the same (NO of S223), the server ECU may transmit an error message Error TLS to the client ECU (S227). In this case, the server and the client may not perform a corresponding TLS session and may directly perform general control communication.

Referring to FIG. 4, the server ECU may add the generated MAC to the TLS version information (TLS info(s)) and the random number Rs to configure the message Server_finish and may transmit the message Server_finish to the client ECU (S230). That is, the message Server_finish may be configured in the form of "(TLS Info/server's Random number)+MAC".

The server ECU may transmit the message Sever finish and may simultaneously generate a session key (S241). Here, the session key may be generated based on the random number (i.e., Rs and Rc) and the PSK of each of the server and the client, and may include an encryption key and a MAC key.

The client ECU may separate the general message and the MAC part from the received message Server_finish and may hash the general message and may decode the MAC part using the PSK (S242).

Then, the client ECU may compare whether a hash value obtained by decoding the MAC and a hash value obtained by hashing the general message part are the same (S243), and when the hash values are the same, the client ECU may compare whether TLS version information (TLS info(s)) included in the general message is the same as TLS version information(TLS info(c)) of the client ECU (S244).

When the hash values are the same and the TLS version information pieces are the same, the client ECU may store the random number Rs of the server ECU in a memory of the client ECU.

Then, the client ECU may transmit the message Client_Finish to the server to notify the server ECU of that encrypted communication preparation is completed (S250), and simultaneously, may generate a session key (S261). Here, the session key may be generated based on the random number (i.e., Rs and Rc) and the PSK of each of the server and the client and may include an encryption key and a MAC key.

Then, when there is a message to be transmitted to the server ECU, that is, an original message, the client ECU may attach the MAC to the corresponding message and may encrypt the message based on a session key (S262) and may transmit the encrypted message to the server ECU (S270). Here, the MAC may be generated by encrypting the hash value of the original message using the session key.

The server ECU may decode and verify the received encrypted message using the session key (S280).

In some forms of the present disclosure, vehicle Ethernet communication further includes encryption and message authentication with respect to an important message to be protected, and thus, whether the corresponding message is transmitted from an appropriate user (i.e., controller) and whether the message is modulated may be determined in terms of a receiver, thereby ensuring the confidentiality of the corresponding message.

In general TLS technology, a handshake procedure includes 10 steps of message exchange, but in some forms of the present disclosure, the handshake procedure may be simplified to 3 steps, and thus, a sufficient time may be advantageously ensured until a general control message is transmitted, and needless to say, certificate/integrity/confidentiality/rejection prevention as a purpose of the general TLS technology may be ensured.

Through the vehicle communication system in some forms of the present disclosure, a delay time may be reduced and security may be maintained using a simplified TLS-based handshake procedure.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A security communication method of a client electronic control unit (ECU) included in a vehicle Ethernet network, the method comprising:
    transmitting, to a server ECU, a first message generated based on a first random number generated by the client ECU, first security version information of the client ECU, and a symmetric key pre-shared with the server ECU;
    receiving, from the server ECU, a second message generated based on a second random number generated by the server ECU, second security version information of the server ECU, and the symmetric key in response to the first message;
    when the second message is verified, storing the second random number in a memory of the client ECU;
    transmitting, to the server ECU, a third message and generating a session key based on the first random number, the second random number, and the symmetric key; and
    transmitting, to the server ECU, a fourth message encrypted using the session key=
    wherein generating the first message includes adding, to a first message part having the first random number and the first security version information, a first message authentication code (MAC) formed by encrypting a hash value of the first message part using the symmetric key,
    wherein generating the second message includes adding, to a second message part having the second random number and the second security version information, a second message authentication code (MAC) formed by encrypting a hash value of the second message part using the symmetric key, and
    wherein storing the second random number comprises:
        separating the second message part and the second message authentication code (MAC) from the second message,
        first comparing the second security version information included in the second message part with the first security version information,
        in response to first comparing, when the second security version information and the first security version information are identical, second comparing a value obtained by decoding the second message authentication code (MAC) using the symmetric key with the hash value of the second message part, and
        in response to second comparing, when the value and the hash value are identical, storing the second random number.

2. The method of claim 1, further comprising:
    in response to first comparing, when the second security version information and the first security version information are not identical, transmitting, to the server ECU, a fifth message; and
    in response to second comparing, when the value and the hash value are not identical, transmitting, to the server ECU, the fifth message.

3. The method of claim 1, wherein an encryption of the fourth message includes adding a third message authentication code (MAC) formed by encrypting a hash value of an original message using the session key, to the original message.

4. The method of claim 1,
    wherein the first message includes a message Client_Hello,
    wherein the second message includes a message Server_Finish, and
    wherein the third message includes a message Client_Finish.

5. The method of claim 1, wherein the first security version information and the second security version information include transport layer security information.

6. The method of claim 1, wherein the session key includes an encryption key and a message authentication code (MAC) key.

7. A non-transitory computer-readable recording medium having a program recorded thereon, the program to direct a processor to perform the method of claim 1.

8. A security communication method of a server electronic control unit (ECU) included in a vehicle Ethernet network, the method comprising:
    receiving, from a client ECU, a first message generated based on a first random number generated by the client ECU, first security version information of the client ECU, and a symmetric key pre-shared with the server ECU;
    when the first message is verified, storing the first random number;
    transmitting, to the client ECU, a second message generated based on a second random number generated by the server ECU, second security version information of the server ECU, and the symmetric key;
    generating a session key based on the first random number, the second random number, and the symmetric key;
    receiving, from the client ECU, a third message in response to the second message; and
    when receiving a fourth message from the client ECU after the third message is received, decoding the fourth message based on the session key,
    wherein generating the first message includes adding, to a first message part having the first random number and the first security version information, a first message authentication code (MAC) formed by encrypting a hash value of the first message part using the symmetric key, wherein generating the second message includes adding, to a second message part having the second random number and the second security version information, a second message authentication code (MAC) formed by encrypting a hash value of the second message part using the symmetric key, and wherein storing the first random number comprises:
separating the first message part and the first message authentication code (MAC) from the first message,
first comparing the first security version information included in the first message part with the second security version information,
in response to first comparing, when the first security version information and the second security version information are identical, second comparing a value obtained by decoding the first message authentication code (MAC) using the symmetric key with the hash value of the first message part, and
in response to the second comparing, when the value and the hash value are identical, storing the first random number.

9. The method of claim 8, further comprising:
in response to first comparing, when the first security version information and the second security version information are not identical, transmitting, to the client ECU, a fifth message; and
in response to second comparing, when the value and the hash value are not identical, transmitting, to the client ECU, the fifth message.

10. The method of claim 8, wherein decoding the fourth message includes adding a third message authentication code (MAC) formed by encrypting a hash value of an original message using the session key, to the original message.

11. The method of claim 8,
wherein the first message includes a message Client_Hello,
wherein the second message includes a message Server_Finish, and
wherein the third message includes a message Client_Finish.

12. The method of claim 8, wherein the first security version information and the second security version information include transport layer security information.

13. The method of claim 8, wherein the session key includes an encryption key and a message authentication code (MAC) key.

14. A non-transitory computer-readable recording medium having a program recorded thereon, the program to direct a processor to perform the method of claim 8.

* * * * *

UNITED STATES PATENT AND TRADEMARK OFFICE
CERTIFICATE OF CORRECTION

PATENT NO. : 11,405,208 B2
APPLICATION NO. : 16/921238
DATED : August 2, 2022
INVENTOR(S) : Ho Jin Jung It is certified that error appears in the above-identified patent and that said Letters Patent is hereby corrected as shown below:

In the Claims

Claim 1, Column 7, Line 48; delete "encrypted using the session key=" and insert --encrypted using the session key,--

Signed and Sealed this
Eleventh Day of October, 2022

Katherine Kelly Vidal
*Director of the United States Patent and Trademark Office*